United States Patent
Faust et al.

(10) Patent No.: US 6,189,966 B1
(45) Date of Patent: Feb. 20, 2001

(54) VEHICLE SEAT

(75) Inventors: Eberhard Faust; Karl Pfahler, both of Stuttgart (DE)

(73) Assignee: DaimlerChrysler AG, Stuttgart (DE)

(*) Notice: Under 35 U.S.C. 154(b), the term of this patent shall be extended for 0 days.

(21) Appl. No.: 09/243,815

(22) Filed: Feb. 3, 1999

(30) Foreign Application Priority Data

Feb. 3, 1998 (DE) .............................. 198 04 100

(51) Int. Cl.[7] .................................................. A47C 7/74
(52) U.S. Cl. ................... 297/180.14; 297/180.13; 297/452.42
(58) Field of Search ................. 297/180.1, 180.14, 297/180.13, 452.46, 452.47, 452.42

(56) References Cited

U.S. PATENT DOCUMENTS

| | | | |
|---|---|---|---|
| 4,853,992 | * | 8/1989 | Yu ................................... 297/180.13 |
| 4,923,248 | * | 5/1990 | Feher ............................... 297/180.13 |
| 5,016,302 | | 5/1991 | Yu . |
| 5,403,065 | | 4/1995 | Callerio . |
| 5,902,014 | * | 5/1999 | Dinkel et al. ............... 297/180.14 X |
| 5,927,817 | * | 7/1999 | Ekman et al. ................. 297/452.47 |
| 5,934,748 | * | 8/1999 | Faust et al. .................. 297/180.1 X |

FOREIGN PATENT DOCUMENTS

| | | |
|---|---|---|
| 3609095 | 10/1986 | (DE) . |
| 295 05 981 | 7/1995 | (DE) . |
| 19628698C1 | 10/1997 | (DE) . |
| 2744896 | 8/1997 | (FR) . |
| 2 751 277 | 1/1998 | (FR) . |
| 42-2176 | 2/1967 | (JP) . |
| 55-21947 | 2/1980 | (JP) . |
| 60-97053 | 7/1985 | (JP) . |
| 64-30042 | 2/1989 | (JP) . |
| 1-110651 | 7/1989 | (JP) . |
| 3-45749 | 4/1991 | (JP) . |
| 3-151912 | 6/1991 | (JP) . |

OTHER PUBLICATIONS

Office Action from the Japanese Patent Office, dated Oct. 26, 1999.

* cited by examiner

Primary Examiner—Anthony D. Barfield
(74) Attorney, Agent, or Firm—Evenson, McKeown, Edwards & Lenahan, P.L.L.C.

(57) ABSTRACT

A vehicle seat has a cushion integrated in a seat part and/or in a backrest. The cushion has a ventilation layer, through which air can flow, and an air-permeable cushion cover which spans the cushion surface. At least one electrically driven ventilator blows air into the ventilation layer. In order to optimize efficiency and rapidity of seat ventilation when cooling heated seat surfaces and achieve a compact seat construction without any space demands under the cushion of the seat part and behind the cushion of the backrest, the ventilator is constructed such that it takes air in axially and blows air out at least radially and is arranged in the ventilation layer itself. The intake opening of the ventilator is exposed on the side of the cushion facing away from the cushion cover.

21 Claims, 2 Drawing Sheets

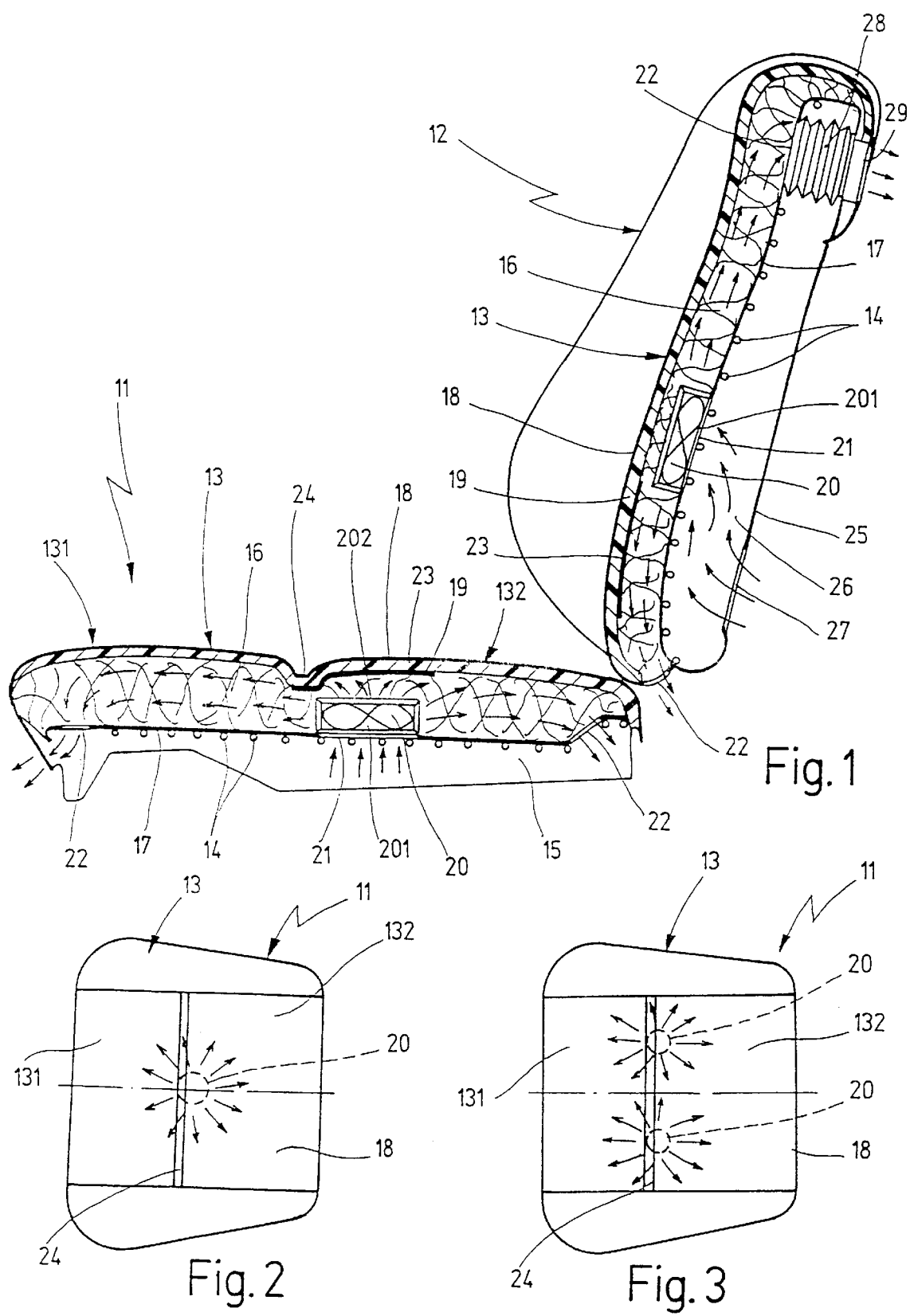

VEHICLE SEAT

This application claims the priority of German patent application No. 198 04 100.4, filed Feb. 3, 1998, the disclosure of which is expressly incorporated by reference herein.

BACKGROUND AND SUMMARY OF THE INVENTION

The present invention relates to a vehicle seat having a cushion integrated in a seat part and/or in a backrest. A ventilation layer through which air can flow is provided in the seat part, the backrest, or both the seat part and the backrest, and an air-permeable cushion cover spans the cushion surface facing a sitting person. The seat has at least one electrically driven ventilator for blowing air into the ventilation layer.

Ventilated vehicle seats of this type are used for improving a conditioned sitting comfort when a parked vehicle which had been overheated by extended sun radiation is entered and over longer driving periods.

In a vehicle seat of this type (German Patent Document DE 196 28 698 C1), a cushion layer or so-called ventilation layer, which consists of a wide-meshed spaced knit and through which air can flow, covers the whole surface of a cushion support made of rubberized hair or foam which rests on a cushion carrier, such as a spring core. The cushion layer is covered on its top or front side facing away from the cushion support by an air-permeable pressure distribution layer made of a spaced knit, nonwoven or open-pore foam. The pressure distribution layer is spanned by a cushion cover, and a cover stuffing is worked in between the cushion cover and the pressure distribution layer. For ventilating the ventilation layer, a plurality of electrically driven miniature fans or miniature ventilators are provided which are inserted into the air ducts worked into the cushion support. These air ducts are arranged to be distributed over the cushion surface. In a limited area above the air duct mouths, an air-impermeable intermediate layer, such as a foil, is in each case arranged on the top side of the ventilation layer facing away from the air duct mouth so that here the air blown by way of the air duct into the ventilation layer does not immediately exit through the pressure distribution layer and the cushion cover but is deflected and flows through the ventilation layer. The miniature fans take in air from the area of the occupant space situated below the seat part and blow this air into the ventilation layer. In the ventilation layer, the air can spread in all directions and, when the seat is unoccupied, flows through the pressure distribution layer and the cushion cover into the air space above the seat surface, causing a rapid cooling of the seat surface heated, for example, by sun radiation. When the seat is occupied, the air flows along in the ventilation layer and exits again at the open ends of the ventilation layer. In the process, it generates a temperature and air humidity gradient and discharges the air moistened by the sitting person.

It is an object of the invention to improve, in the case of a vehicle seat of the initially mentioned type, the efficiency and rapidity of the seat ventilation when reducing heated seat surfaces to comfortable temperatures and to permit a structural shape of the vehicle seat which is as compact as possible.

In a vehicle seat of the type mentioned above, this object is achieved according to the invention by constructing the ventilator such that it takes air in axially and blows air out at least radially, and by arranging the ventilator in the ventilation layer with an intake opening which is exposed on a side of the cushion facing away from a cushion cover.

The vehicle seat according to the invention has the advantage that, because of the direct integration of a ventilator in the ventilation layer which blows at least radially all around, even when the dimensioning of the ventilator is small and its power is low, a sufficiently high air flow rate is achieved in the ventilation layer which cools a cushion heated by sun radiation to comfortable temperatures within a short time when the seat is unoccupied. For cooling of the cushion in the seat part and/or in the backrest, only a few ventilators are required. In an extreme case, only a single ventilator which is arranged in the center of the cushion surface is provided. Furthermore, integration of the ventilator in the ventilation layer, within limits, permits an optional placing of the ventilators so that they can be accommodated better in a cushion zone where the necessary space is available. The space normally required under the cushion for accommodating the ventilators is not required, which is a significant advantage for modern seats because this space is needed for housing so-called anti-submarining wedges or ramps and for electronic and pneumatic automatic seat adjustment systems.

According to a preferred embodiment of the invention, the ventilation layer is an air-permeable cushion support which rests on the cushion carrier only by way of an intermediately placed air-impermeable pressure distribution layer. In the pressure distribution layer, an air inflow is constructed which is congruent with the intake opening of the at least one ventilator. By constructing the cushion in this way, a low-cost vehicle seat is achieved which can be used in vehicles of the medium and low price classes. Simultaneously, an extremely compact vehicle seat is created which, in addition, requires no space under the cushion of the seat part or behind the cushion of the backrest.

BRIEF DESCRIPTION OF THE DRAWINGS

In the following, the invention is described in detail with reference to embodiments illustrated in the drawing.

FIG. 1 is a schematic longitudinal sectional view of a vehicle seat;

FIG. 2 is a schematic top view of the seat part of the vehicle seat in FIG. 1;

FIG. 3 is the same schematic representation as in FIG. of a modified seat part.

DESCRIPTION OF THE PREFERRED EMBODIMENTS

Figure 4:
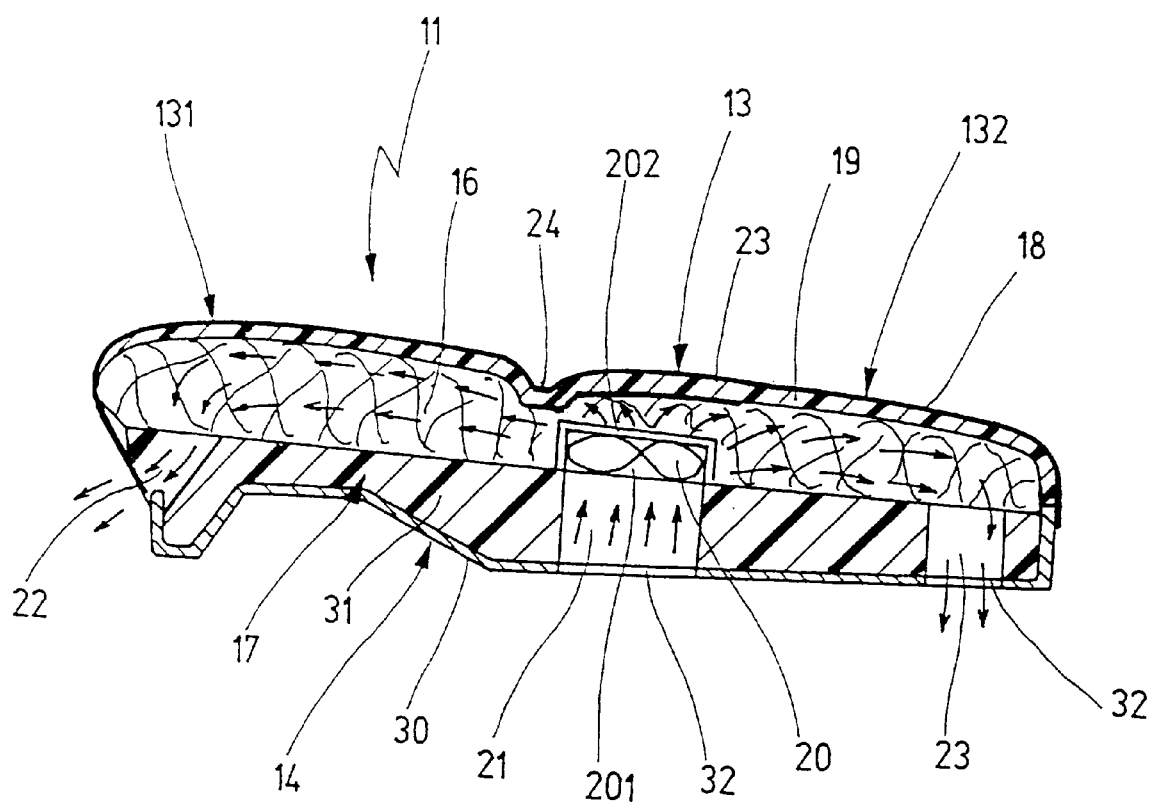
FIG. 4 is a schematic longitudinal sectional view of a seat part of a vehicle seat according to another embodiment.

The vehicle seat outlined in FIG. 1 in a schematic longitudinal sectional view, in a known manner, has a seat part 11 adjustably held on the vehicle floor and a backrest 12 which, for adjusting the inclination, is connected with the seat part 11 by way of a swivel locking. The seat part 11 and the backrest 12 each have a cushion 13 which is fastened on a cushion carrier 14. In the embodiment of FIG. 1, the cushion carrier 14 is constructed as a spring core made of spring wire which is in each case fastened in a frame. In the seat part 11, the frame has the reference number 15 while, for reasons of clarity, the frame in the backrest 12 was omitted. The cushion 13, which has the same construction for the seat part 11 as for the backrest 12, comprises an air-permeable cushion support 16 made of a coarsely structured nonwoven material, such as rubberized hair, or of a spaced knit, and an air-impermeable pressure distribution layer 17 made of a nonwoven or rubberized-hair material of a high density which rests directly on the cushion carrier 14 and completely covers the cushion support 16 on its underside in the seat part 11 and on its back side in the backrest 12. The top side or front side of the cushion 13, which faces away from the pressure distribution layer 17, is covered by an air-permeable cushion cover 18 made of a textile fabric or perforated leather or synthetic material, and a cover stuffing 19 made of cushion padding, nonwoven wool, an open-pore or at least partially perforated foamed material, or a padding-foam combination is worked in between the cushion support 16 and the cushion cover 18. When an electric seat heater (not shown here in detail) is used, its heating wires are embedded in the cover stuffing 19.

The air-permeable cushion support 16 represents a so-called ventilation layer, through which air can flow by an electrically driven fan or ventilator 20. The ventilator 20 is constructed such that it takes in axially and blows out radially all around, or radially all around and axially. The ventilator is arranged in the ventilation layer, and thus the air-permeable cushion support 16, such that its intake opening 201 is exposed on the side of the cushion 13 facing away from the cushion cover 18. For this purpose, an air inflow opening 21 is provided in the pressure distribution layer 17 and is congruent with the intake opening 201 of the ventilator 20. The ventilator 20 rests, by way of its intake opening 201, directly on the air inflow opening 21, covering it. In the cushion 13 of the backrest 12, the ventilator 20 is constructed as a radial-flow fan with an axial intake opening 201 and a radial blow-out direction, and in the cushion 13 of the seat part 11, the ventilator 20 blows to all sides, thus axially as well as radially. The blowing directions of the ventilator 20 are indicated by flow arrows.

The ventilator 20 is preferably arranged in the central area of the cushion 13 so that, in the air-permeable cushion support 16 in the seat part 11, the air flows to the front and to the rear as well as sideways, and in the cushion support 16 of the backrest 12, the air flows upward as well as downward and also sideways. On the forward and rearward or upper and lower ends as well as the lateral ends of the cushion 13, the air returns into the vehicle interior. So that the air can exit unhindered from the cushion 13 and therefore a sufficiently high air humidity and temperature gradient with respect to the micro-air-conditioning on the cushion surface is achieved, in order to discharge the transpiration moisture produced by the sitting person from there properly, air outflow openings 22 are provided in the pressure distribution layer 17 on its forward and rearward or upper and lower ends. These air outflow openings 22 also reduce the flow resistance of the cushion support 16 as a whole, so that the efficiency of the seat ventilation is improved. Also, so that when the seat is occupied, the air blown out by the ventilator 20 through the cushion cover 18 will not blow directly at the person sitting in the seat and create unpleasant draft phenomena, in the cushion 13 of the seat part 11, in which a ventilator 20 is installed with a blowing direction to all sides, thus radially and axially, an air-impermeable blocking layer 23, such as a foil, is mounted in the area of the axial blow-out opening 202 of the ventilator 20 on the surface of the cushion support 16. This blocking layer 23 prevents the exiting of air through the cover stuffing 19 and the cushion cover 18 and deflects the axially blown-out air by approximately 900 so that it flows along in the upper edge area of the cushion support 16. The blocking layer 23 may extend beyond the direct area of the axial blow-out opening 202 and may be at least partially perforated in its course so that different cushion areas are ventilated with different intensities.

When the ventilator 20 is constructed as a pure radial-flow fan in the cushion 13 in the backrest 12, the blocking layer 23 is omitted because the ventilator 20 blows out only radially. However, in order to protect the kidney area of a seat occupant, an identical blocking layer 23 is inserted below the ventilator 20 between the cover stuffing 19 and the cushion support 16 and prevents air from passing through the cushion cover 18 into the kidney area and resulting in draft phenomena there.

In the embodiment of the vehicle seat according to FIG. 1, one ventilator 20, respectively, is disposed in each of the cushions 13 of the seat part 11 and the backrest 12. These ventilators 20 are arranged approximately in the center in the seat surface and the backrest surface area of the cushion surface. In the cushion 13 of the seat part, the ventilator 20 is arranged close to a quilting 24. This quilting divides the cushion surface in the seat part 11 into a forward cushion zone 131 and a rearward cushion zone 132 facing the backrest 12. The ventilator 20 in the cushion 13 of the backrest 12 is arranged slightly below the cushion center.

As illustrated in FIG. 3, two ventilators 20 in the cushion 13 of the seat part 11, which are arranged side-by-side in a transverse spacing viewed in the direction of the seat width, may also be provided for the seat part 11. An identical arrangement of two ventilators 30 can also be provided in the cushion 13 of the backrest 12.

In a known manner, the backrest 12 is covered on its backside by a backrest covering 25 which is fastened at the lower end of the backrest 12 on the backrest frame and close to the upper end of the backrest 12 on the cushion cover 18, which for this purpose is pulled over the upper edge of the backrest 12 to the backside of the backrest 12. Between the backrest covering 25 and the cushion 13 disposed on the cushion carrier 14, a hollow space exists which is utilized for the guiding of air. The hollow space permits the ventilator 20 in the backrest cushion 13 to take in air from the vehicle interior close to the vehicle floor because here the heating of the interior is the lowest when the vehicle is parked in the sun. For this purpose, an air inlet opening 27 is provided close to the lower end of the backrest 12 in the backrest covering 25, and the upper air outflow opening 22 in the pressure distribution layer 17, by way of an air duct 28 which is flexible in the axial direction and which in the embodiment of FIG. 1 is constructed as a bellows, is connected to an outlet opening 29 which is constructed in the area of the cushion cover 18 pulled to the backside of the backrest 12.

When the ventilators 20 are switched on, air is taken in from the vehicle interior by each ventilator 20 by way of the air inlet opening 27 and is blown all around radially and optionally axially into the cushion support 16. When the seat is unoccupied, the air passes through the air-permeable cover stuffing 19 and the air-permeable cushion cover 18 out into the space above the cushion top surface or front surface. A residual portion of air flows out by way of the air outflow openings 22 in the pressure distribution layer 17 directly, in the case of the seat part 11, or directly and by way of the air duct 28 and the air outlet opening 29 in the cushion cover 18, in the case of the backrest 12, into the vehicle interior. When the seat is occupied, the largest portion of the air blown by the ventilator 20 into the cushion support 16 flows unhindered by way of the air outflow openings 22 in the pressure distribution layer 17 in the case of the seat part 11 directly or, in the case of the backrest 12, directly and through the air duct 28 and the air outlet opening 29 in the cushion cover 18 out from the cushion support 16. As a result, a fairly large air humidity and temperature gradient is generated with respect to the micro-air-conditioning on the cushion surface of the cushion 13, and the transpiration moisture produced by a sitting person is sufficiently discharged by the cushion surface.

In the modified seat part 11 of a vehicle seat illustrated as a longitudinal sectional view in FIG. 4, the cushion carrier 14 is constructed as a seat bucket 30 and the air-impermeable pressure distribution layer 17 is constructed as a foam body 31 which is supported on the seat bucket 30. The air inflow opening 21 and the air outflow openings 22 in the pressure distribution layer 17 are formed by ducts 23 which penetrate the foam body 31 and correspond with openings 32 in the seat bucket 30. Otherwise, the seat part 11 according to FIG. 4 is constructed in the same manner as the seat part 11 in FIG. 1, so that identical components are provided with the same reference numbers.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle seat having a cushion with a cushion surface integrated in at least one of a seat part and a backrest, comprising:
   a ventilation layer, through which air can flow,
   an air-permeable cushion cover which spans the cushion surface which is adapted to be face a sitting person, and
   at least one electrically driven ventilator for blowing air into the ventilation layer,
   wherein the ventilator is constructed such that it takes air in axially and blows air out at least radially, and wherein the ventilator is directly integrated in the ventilation layer and has an intake opening which is exposed on a side of the cushion facing away from the cushion cover.

2. Seat according to claim 1, wherein the ventilator is constructed as a radial-flow fan and said intake opening is an axial intake opening of said radial-flow fan.

3. Seat according to claim 2, and further comprising an air-impermeable pressure distribution layer, wherein the ventilation layer is an air-permeable cushion support which rests on a cushion carrier with an intermediate placing of said air-impermeable pressure distribution layer, and wherein the pressure distribution layer has an air inflow opening which is congruent with the intake opening of the ventilator.

4. Seat according to claim 1, and further comprising an air-impermeable blocking layer, wherein the ventilator is constructed such that it additionally blows out axially, and wherein, in an area of an axial blow-out opening of the ventilator, a top side of the ventilation layer facing away from the axial blow-out opening is covered by said air-impermeable blocking layer.

5. Seat according to claim 4, wherein the blocking layer extends beyond a direct area of the axial blow-out opening of the ventilator and is at least partially perforated in its course.

6. Seat according to claim 1, and further comprising an air-impermeable pressure distribution layer, wherein the ventilation layer is an air-permeable cushion support which rests on a cushion carrier with an intermediate placing of said air-impermeable pressure distribution layer, and wherein the pressure distribution layer has an air inflow opening which is congruent with the intake opening of the ventilator.

7. Seat according to claim 6, wherein the air inflow opening in the pressure distribution layer and the intake opening of the ventilator directly adjoin one another.

8. Seat according to claim 6, wherein air outlet openings are constructed in the pressure distribution layer and have the largest possible distance from the ventilator.

9. Seat according to claim 8, wherein, when viewed in the direction of depth of the seat part, the air outlet openings are arranged close to forward and rearward ends of the cushion and, when viewed in the direction of height of the backrest, the air outlet openings are arranged close to upper and lower ends of the cushion.

10. Seat according to claim 9, wherein, on its backside facing away from the cushion cover, the backrest is covered by a backrest covering, and between the cushion and the backrest covering, a hollow space is constructed which is provided with an air inlet opening, and wherein an upper air outflow opening of the air outflow openings, by way of an air duct in the pressure distribution layer, is connected to an air outlet opening constructed in the backrest covering, and a lower air outflow opening is arranged outside the hollow space on the underside of the backrest.

11. Seat according to claim 10, wherein an air inlet opening is constructed in a lower area of the backside of the backrest in the backrest covering.

12. Seat according to claim 9, wherein, on its backside facing away from the cushion cover, the backrest is covered by a backrest covering, between the cushion and the backrest covering, a hollow space is constructed which is provided with an air inlet opening, an upper air outflow opening of the air outflow openings, by way, of an air duct in the pressure distribution layer, is connected to an air outlet opening constructed in an area of the cushion cover pulled over the upper edge of the backrest to the backside of the backrest, and a lower air outflow opening of the air outlet openings is arranged outside the hollow space on an underside of the backrest.

13. Seat according to claim 12, wherein an air inlet opening is constructed in a lower area of the backside of the backrest in the backrest covering.

14. Seat according to claim 8, wherein the cushion carrier is a seat bucket, the air-impermeable pressure distribution layer is constructed as a foam cushion supported on the seat bucket, and the air inflow and air outflow openings are formed by ducts which penetrate the foam cushion, at least some of said ducts leading into corresponding openings in the seat bucket.

15. Seat according to claim 6, and further comprising an air-permeable cover stuffing arranged between the air-permeable cushion support and the air-permeable cushion cover.

16. Seat according claim 6, wherein the cushion carrier is a spring core clamped into a frame, and the air-impermeable pressure distribution layer consists of a nonwoven or rubberized hair material of a high density.

17. Seat according to claim 6, and further comprising a cover stuffing, made of any of cushion padding, nonwoven wool, an open-pore foam layer, an at least partially perforated foam layer and a padding-foam combination, exists between the air-permeable cushion support and the air-permeable cushion cover. an air inlet opening, an upper air outlet opening of the air outlet openings, in the pressure distribution layer by way of an air duct, is connected to an air outlet opening constructed in an area of the cushion cover pulled over the upper edge of the backrest to the backside of the backrest, and a lower air outlet opening of the air outlet openings is arranged outside the hollow space on an underside of the backrest.

18. Seat according to claim 17, and further comprising an electric seat heater having heat conductors embedded in said cover stuffing.

19. Seat according to claim 4, wherein said air-impermeable blocking layer is a foil.

20. Seat according to claim 1, wherein the at least one ventilator is placed approximately in the center in the cushion surface.

21. Seat according to claim 1, wherein said at least one ventilator includes two ventilators arranged approximately in the center in the cushion surface and side-by-side and transversely spaced in the direction of seat width.

* * * * *